March 2, 1943.    P. S. CARTER    2,312,799

ULTRA-SHORT WAVE SYSTEM

Filed Feb. 1, 1941

Direct Ray-Field Vector Variation

Indirect Ray-Field Vector Variation

INVENTOR
Philip S. Carter
BY
ATTORNEY

Patented Mar. 2, 1943

2,312,799

UNITED STATES PATENT OFFICE 2,312,799

ULTRA SHORT WAVE SYSTEM

Philip S. Carter, Port Jefferson, N. Y., assignor to Radio Corporation of America, a corporation of Delaware Application February 1, 1941, Serial No. 377,003

4 Claims. (Cl. 250—11)

This invention relates to the transmission and reception of radio signals on wavelengths below ten meters, and particularly to the transmission and reception of signals which are quasi-optical in character.

In a radio circuit employing ultra high frequencies for communication between two points within the range substantially of optical vision, it has been found that the signal received at the receiving station will vary in amplitude as the frequency is changed. Such variation in amplitude of the received signal is caused by a change in phase between the direct and indirect (that is, the reflected) rays received from the transmitter antenna due to the differences in the lengths of the paths traversed by these different rays. These indirect rays produce fluctuations in the receiver response curve and hence distortion of signals.

Under usual conditions wherein buildings and various structures are to be found in the vicinity of the transmitting and receiving stations, reflections of the signals take place from surfaces having almost every conceivable angle to the horizon and it is for this reason that the usual vertical and horizontal antennas, or antennas polarized at an angle of 45° to the horizon, will not eliminate the effects of the indirect rays and will fail to flatten out the response curve at the receiver. The present invention is based upon an appreciation of the fact that under usual conditions the direction of rotation of the electric field of a circularly polarized wave will be reversed upon reflection from some surface, a condition which holds true regardless of the angle of the reflecting surface to the horizon. In ultra short wave systems contemplated in the present invention, wherein radio signals of quasi-optical character are transmitted between points substantially within the range of optical vision, distortions caused by indirect rays (produced by reflections) are eliminated by employing a transmitting antenna which radiates a circularly polarized wave and a receiving antenna so constructed as to receive only a circularly polarized wave having the same direction of rotation as that radiated from the transmitting antenna. This receiving antenna will have no response for a circularly polarized wave of the opposite direction and therefore receives little or no energy from indirect rays which are elliptically polarized with a rotation opposite to that of the transmitted wave.

A more detailed description of the invention follows, in conjunction with a drawing wherein.

Figure 1:
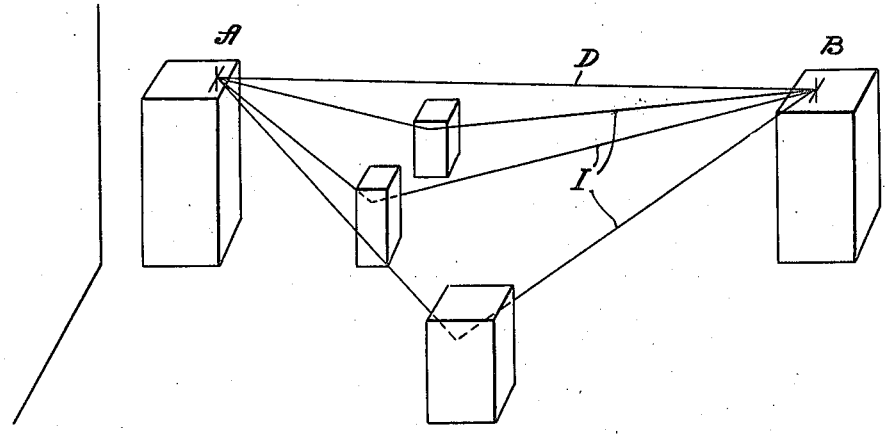
Fig. 1 illustrates, for purposes of exposition, the manner in which the indirect or reflected rays from a transmitter may interfere with the direct ray received at a distant point in an ultra short wave system.

Referring to Fig. 1, there are shown two buildings A and B spaced apart from one another in the direct line of sight and between which it is desired to transmit waves of extremely high frequencies. Line D indicates the path of travel of the direct ray between the transmitter station on one of these buildings and the receiver station on the other. Lines I indicate the paths of travel of the indirect or reflected rays between the two stations. These indirect rays are in different planes and are reflected from the surrounding buildings (as well as from ground) and are received at the receiving station over paths which are considerably longer than the direct path D, and thus tend to give rise to irregularities in the response curve at the receiver. In practice, there are a very large number of indirect rays between the transmitting and receiving stations, as may be observed from an inspection of Figs. 1, 2 and 3 of my article "Ultra High Frequency Transmission Between the RCA Building and the Empire State Building in New York City," published in the Proc. I. R. E., August, 1936, pages 1082 to 1094, to which attention is invited.

Figure 2:
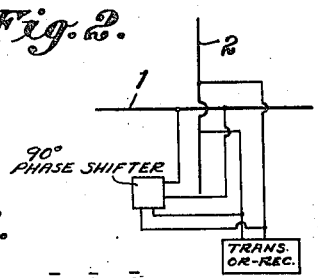
Fig. 2 illustrates, by way of example only, one type of antenna system which can be used both at the transmitter and at the receiver for respectively producing and receiving circularly polarized waves.

Fig. 2 is illustrative of one type of antenna system which may be used at both the transmitter and receiver for respectively producing and receiving circularly polarized waves. This antenna comprises two aerials 1 and 2 located at 90° to one another and placed in the same vertical plane with their centers on the same horizontal axis. These aerials are separately excited with currents displaced in phase by 90°. If the transmitting antenna is arranged to radiate a circularly polarized wave having right hand rotation, looking in the direction of the receiver, then an identical arrangement should be used at the receiver. The receiving antenna is identically arranged relative to its translating apparatus when seen by looking through one antenna to the other antenna. With such an arrangement the receiving antenna will thus not be responsive to a circularly polarized wave with a left hand rotation and consequently will receive little or no energy from indirect rays which are elliptically polarized with a left hand rotation and in which the ellipse does not usually depart greatly from a circle.

If we desire to propagate and receive only circularly polarized waves having a left hand rotation looking in the direction of the receiver, then the relative polarities of the two dipoles of both the transmitting and receiving antennas should be reversed.

The electric field vector in a circularly polarized wave may always be considered as the resultant of two non-rotating vectors at right angles having a 90° time phase relationship. Therefore, in considering reflection from a surface having any angle whatever to the horizontal, the circularly polarized wave may be considered as a combination of two waves, one polarized in the plane of incidence and one polarized at right angles to the plane of incidence. Excepting for very large angles of incidence (small angles to the surface) the phase of a wave polarized in the plane of incidence is unchanged upon reflection whereas the phase of a wave polarized perpendicular to the plane of incidence is always reversed upon reflection. The final effect of these phenomena is that of reversing the direction of rotation of a circularly polarized wave after reflection. If the reflection surface is a very good conductor, the wave after reflection will remain perfectly circularly polarized but when the surface is a poor conductor the wave after reflection is elliptically polarized and departs more or less from a circle, depending principally upon the dielectric constant and angle of incidence to the surface, changes in the assumed low conductivity having a negligibly small effect. In the present connection, any metallic surface may be considered a very good conductor while stone and concrete may be considered poor conductors.

The amount of response of the receiver to the direct wave depends upon the amount the ellipse departs from a circle. The departure of the ellipse from a circle depends in a rather complex way upon dielectric constant, conductivity and angle of incidence to the surface. When the surface is a fairly good conductor, neither the angle of incidence nor the dielectric constant is of any consequence. However, when the conductivity is low, the coefficient of reflection depends upon the dielectric constant and the angle of incidence and is different for a wave polarized in the plane of incidence from the factor for a wave polarized perpendicularly to the plane of incidence. For a wave polarized in the plane of incidence, there is a critical angle known as the "Brewster angle" at which the coefficient of reflection is nearly zero. This angle is in the vicinity of 75° to 70° for substances such as stone and concrete.

Figure 3:
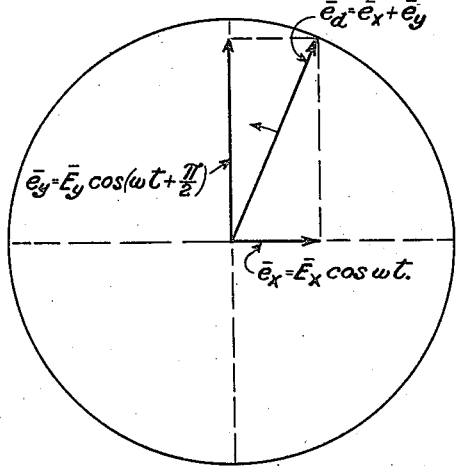
Figs. 3 and 4 are vector diagrams showing the relations in a circularly polarized wave before and after reflection.

Fig. 3 is a vector diagram showing the relations in a circularly polarized wave having a left hand rotation.

Figure 4:
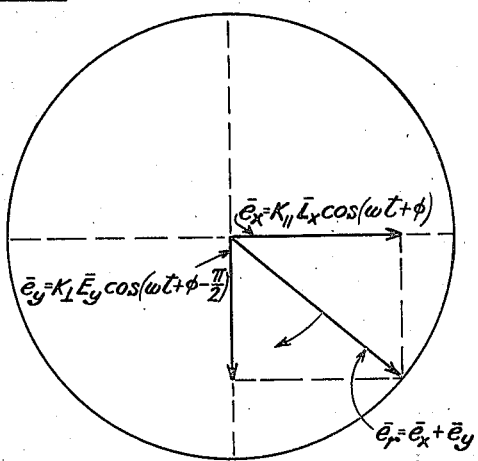

Fig. 4 is a diagram showing the relations for the same type of wave after reflection.

The electric field vector of a circularly polarized wave may be considered as the instantaneous sum of any two mutually perpendicular vectors lying in the wave front having a time phase quadrature relation. Thus, in Fig. 2, if $\bar{e}_x$ and $\bar{e}_y$ are the instantaneous $x$ and $y$ components, the instantaneous total electric field vector $\bar{e}_d$ is given by $\bar{e}_d = \bar{e}_x + \bar{e}_y$. (Dashed lines above symbols are here used to indicate true vector quantities or forces.) If $\bar{E}_x$ and $\bar{E}_y$ represent the maximum instantaneous values or amplitudes of the $x$ and $y$ vector components, and we let $\bar{e}_x = \bar{E}_x \cos \omega t$, then if we assume $\bar{e}_y$ leads $\bar{e}_x$ by 90° in time phase, we must have for $$\bar{e}_y: \bar{e}_y = \bar{E}_y \cos(\omega t + \pi/2),$$

$\omega$ being the angular frequency. For the direct ray field $\bar{e}_d$, we then have:

$$\bar{e}_d = \bar{E}_x \cos \omega t + \bar{E}_y \cos(\omega t + \pi/2),$$

which represents the vector of constant length shown in Fig. 2 describing the circle with a left hand rotation at an angular velocity $\omega$. The magnitude of $\bar{e}_d = |\bar{e}_d|$ is given by:

$$|e_d| = \sqrt{(E_x \cos \omega t)^2 + (E_y \cos(\omega t + \pi/2))^2}$$
$$= \sqrt{2 E_x}, \text{ since } |E_y| = |E_x|$$

Let us now assume that the direction $y$ lies in a reflecting surface and that the $x$ coordinate lies in the plane of incidence. The incident wave component, polarized in the plane of incidence or in the $x$ direction, must be represented by $\bar{e}_x = \bar{E}_x \cos(\omega t + \phi)$, $\phi$ being a phase angle due to the path having a different length than the path of the direct ray to the receiver. If the surface is a fairly good conductor or in any case if the angle of incidence is not too great, the phase of this wave component is not changed upon reflection so that the reflected $x$ component of the electric field is given by $\bar{e}_x = K_{//} \bar{E}_x \cos(\omega t + \phi)$ where $K_{//}$ is the reflection factor. The wave component polarized perpendicular to the plane of incidence or the $y$ direction has its phase reversed upon reflection so that after reflection it must be represented by $\bar{e}_y = K_{/} \bar{E}_y \cos(\omega t + \phi - \pi/2)$, where $K_{/}$ is the coefficient of reflection for a wave polarized perpendicular to the plane of incidence. When the reflecting surface is a fairly good conductor, $K_{//}$ and $K_{/}$ approach unity; the magnitudes of the two reflected wave components $\bar{e}_x$ and $\bar{e}_y$ are equal and the resultant electric vector $\bar{e}_r$ is constant in magnitude but has a right hand rotation as shown in Fig. 3. When the reflecting surfaces are poor conductors, the reflection factors $K_{//}$ and $K_{/}$ are unequal and the terminus of the electric vector of the reflected wave describes an ellipse rather than a circle.

The present invention finds particular application in television relay systems wherein it is desired to reduce or eliminate distortions due to fluctuations in the receiver response curve caused by indirect rays. The invention is not limited to the particular type of antenna shown. If any two antenna systems are placed so as to have the same center of gravity for the antenna currents and rotated about the center of gravity with respect to each other and these two units are excited in quadrature phase relation, a circularly polarized wave will result.

What is claimed is:

1. An ultra short wave radio system for the transmission and reception of waves below ten meters, comprising a transmitter station and a receiver station spaced apart within the line of sight of each other and located in an area having objects which reflect the rays emanating from the transmitter, an antenna arrangement at said transmitter for radiating along substantially said line of sight in a direction toward the receiver circularly polarized radio waves having a particular direction of rotation, and an antenna arrangement at said receiver responsive to circularly polarized waves of substantially only said direction of rotation.

2. An ultra short wave radio system for the transmission and reception of waves below ten meters, comprising a transmitter station and a receiver station spaced apart within the line of sight of each other and located in an area having objects which reflect the rays emanating from the transmitter, means at said transmitter for radiating along substantially said line of sight in a direction toward the receiver circularly polarized radio waves having a right hand rotation for the electric field, and means at said receiver responsive to circularly polarized waves whose electric field has substantially only said right hand direction of rotation.

3. An ultra short wave radio system for the transmission and reception of waves below ten meters, comprising a transmitter station and a receiver station spaced apart within the line of sight of each other and located in an area having objects which reflect the rays emanating from the transmitter, means at said transmitter for radiating along substantially said line of sight in a direction toward the receiver circularly polarized radio waves having a left hand rotation for the electric field, and means at said receiver responsive to circularly polarized waves whose electric field has substantially only said left hand direction of rotation.

4. An ultra short wave radio system for the transmission and reception of waves below ten meters, comprising a transmitter station and a receiver station spaced apart within the line of sight of each other and located in an area having objects which reflect the rays emanating from the transmitter, a multiple dipole antenna arrangement in the vertical plane at said transmitter for radiating along substantially said line of sight in a direction toward the receiver circularly polarized radio waves having a particular direction of rotation, and a similar multiple dipole antenna arrangement also in the vertical plane at said receiver responsive to circularly polarized waves of substantially only said direction of rotation.

PHILIP S. CARTER.